United States Patent

[11] 3,612,115

| [72] | Inventor | Alva Z. Albright |
| | | P.O. Box 762, Woodstock, Ontario, Canada |
| [21] | Appl. No. | 877,335 |
| [22] | Filed | Nov. 17, 1969 |
| [45] | Patented | Oct. 12, 1971 |

[54] CHAIN SAWS
3 Claims, 3 Drawing Figs.

| [52] | U.S. Cl. | 143/32 N, 144/34 R |
| [51] | Int. Cl. | A01g 23/08, B27b 17/02 |
| [50] | Field of Search | 143/32, 32 N; 144/34 D, 34 E |

[56] References Cited
UNITED STATES PATENTS

| 3,364,964 | 1/1968 | Lacey | 144/34 R |
| 2,876,816 | 3/1959 | Busch et al. | 144/34 E |
| 3,140,736 | 7/1964 | Propst | 144/3 D |

FOREIGN PATENTS

| 142,106 | 3/1961 | U.S.S.R. | 143/32 N |

Primary Examiner—Donald R. Schran
Attorney—James B. Lake, Jr.

ABSTRACT: A chain saw having a straight-backed anvil mounted on a powered vehicle for rotation around an approximately longitudinal axis to vertically open and close to pick up felled trees, said anvil being indented to initially engage trees for felling to avoid detracking saw chain and the free end being longitudinally tapered to make sliding contact rather than butting contact with trees, the cutter bar being transversely tapered in its middle part to leave the pivoted end of said bar at full thickness for strength, the free end being flat and thinned to the same thickness as the thinnest part of said transverse taper.

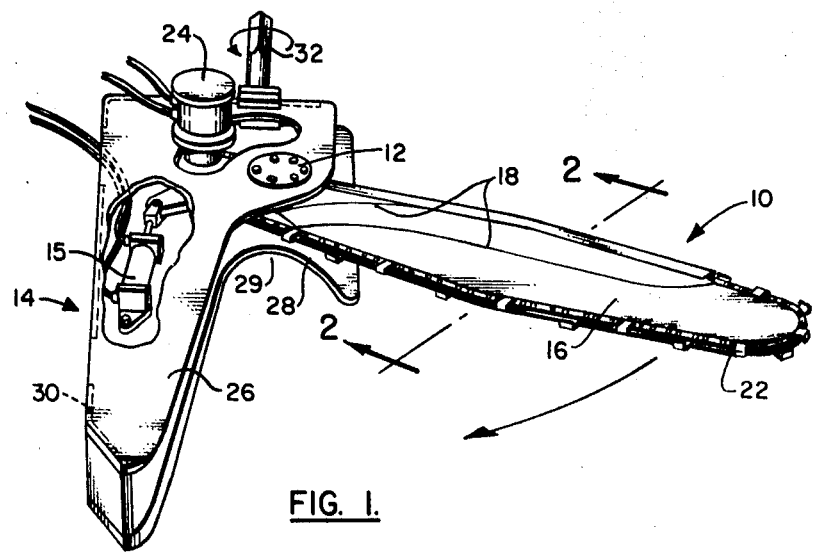
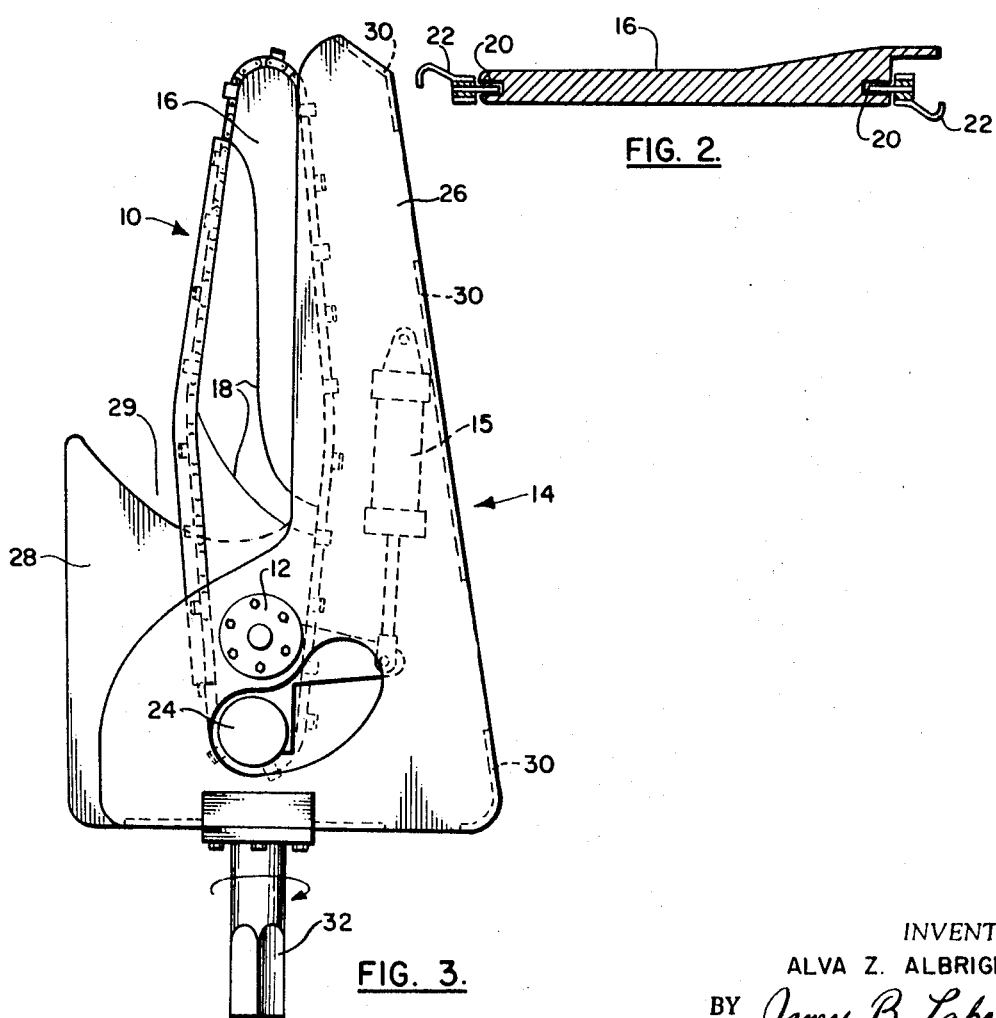
INVENTOR.
ALVA Z. ALBRIGHT
BY *James B. Lake, Jr.*
ATTORNEY

CHAIN SAWS

The invention relates generally to chain saws and more particularly to chain saws having an anvil for scissors action as described in my copending application for U.S. Pat. Ser. No. 766,032 filed Oct. 30, 1968, now U.S. Pat. No. 3,565,138.

The presently disclosed invention is an improvement on the invention described and claimed in the aforementioned application.

Chain saws with pivoted anvils for felling trees are generally mounted flexibly for raising and lowering on the front of any convenient powered vehicle. When the powered vehicle is initially run up to a tree to engage it between the anvil and the cutter bar, the run of the saw chain on the cutter bar engaging the tree is often detracked and must be replaced on the cutter bar.

It is an object of the invention to provide a chain saw pivoted to an anvil having means for preventing a run of the saw chain from being detracked by an initial contact with the tree.

Another object of the invention is to transversely taper the center third of the cutter bar for wedge-action cutting and thinning and flattening the free end for cutting without wedge action. Another object of the invention is to provide a chain saw and anvil with a rotational fastening to a powered vehicle in order that the invention can be used to pickup and move felled trees.

Another object of the invention is to provide a tapered forward end to the anvil in order to prevent direct engagement with a tree.

Other objects and a fuller understanding of the invention can be had by referring to the following specifications and claims and the drawings in which:

FIG. 1 is an isometric view from above, partially cut away to show an hydraulic cylinder, of the invention, FIG. 2 is a cross-sectional view taken along section lines 2—2 of FIG. 1, and FIG 3 is a top view of the invention.

Referring to the FIGS. 1 and 2 the invention comprises a chain saw 10 pivoted at one end by pivot 12 to an anvil 14 and adapted to open and close in scissors fashion by means of the hydraulic cylinder 15. The chain saw 10 comprises a flat cutter bar 16 tapered transversely toward the anvil 14 for the middle third of its length as shown by taper lines 18, and being left untapered around the pivot 12 for strength. The perimeter of the cutter bar defines tracks 20 (see FIG. 2) for mounting a saw chain 22 thereon for endless rotation around said perimeter. A motor 24 drives the saw chain.

The anvil 14 is a hollow composite member comprising upper and lower plates 26 and 28 respectively that are spaced apart and fastened together by a plurality of sideplates 30 extending for short distances along their edges as shown in broken lines in FIGS. 1 and 3. The lower plate 28 is indented to form a notch 29 forward of the pivot 12 and defining a smaller angle than the one described by the chain saw and the anvil when fully opened in scissors action. When fully closed the cutting run of the chain saw is recessed within the anvil structure as shown in FIG. 3.

A mounting bar 32 is bolted to the pivoted end of the anvil 14 for rotatably mounting the invention of any convenient powered vehicle (not shown). The invention is adapted to rotate 90°, thereby allowing a scissor action in a vertical plane with the anvil as the lower part to engage and hold a felled tree between the anvil and chain saw.

To use the improvements, the invention, mounted on a powered vehicle, is actuated as follows: the chain saw and anvil is pivoted by the hydraulic cylinder to open fully and then run up to a tree to be felled, engaging it in the notch 29 of the anvil 14. The chain saw motor is started driving the chain saw and the hydraulic cylinder is set to pivot the anvil and chain saw together thereby sawing the tree down. The motor is stopped and the powered vehicle backed away. The invention is then rotated 90° with the anvil adjacent the ground and the chain saw and anvil pivoted open as in the beginning. The powered vehicle is then driven forward to engage the felled tree in the notch 29 and the chain saw and anvil pivoted as close as the tree will permit and without driving the saw chain. The flat back and the tapered end of the anvil facilitates engaging the tree only, which can then be dragged clear of the next felling.

The felling of a tree is facilitated by making the initial cut with the thin untapered end of the cutter bar. When the cut is about two thirds through the tree, it is completed at the tapered middle of the cutter bar by advancing the power train. In this way friction is reduced on the cutter bar by delaying the wedging action until the resistance of the tree is reduced by the initial cut.

What is claimed is:

1. An improved chain saw for mounting on a powered vehicle to fell trees comprising: a cutter bar transversely tapered for the middle part of its length, and having an untapered thick end extending to the transversely tapered part and a flat opposite thin end extending from the transversely tapered part having the same thickness as the thinnest part of the transversely tapered part; and a hollow anvil pivoted to the thick end of said center bar for scissors action said anvil extending around said pivot to define a wedge-shaped indentation forward of the pivot and angularly less than the angle defined by the cutter bar and anvil when pivoted fully apart.

2. An improved chain saw as described in claim 1 wherein said anvil is flat-backed and mounted on said powered vehicle to rotate at least 90° for said center bar to pivot in scissors action in a horizontal plane for cutting trees and upward in a vertical plane for engaging fallen trees.

3. An improved chain saw as described in claim 1 wherein said anvil is tapered at the free outer end for making sliding contact rather than butting contact with trees.